(12) United States Patent
Jansen et al.

(10) Patent No.: US 11,209,292 B2
(45) Date of Patent: Dec. 28, 2021

(54) REMOTE SENSING SYSTEM

(71) Applicant: ADVA Optical Networking SE, Meiningen OT Dreissigacker (DE)

(72) Inventors: Sander Jansen, Germering (DE); Uwe Gröschner, Metzels (DE); Gunter Schubert, Walldorf (DE); Hendrik Beil, Meiningen (DE)

(73) Assignee: ADVA OPTICAL NETWORKING SE, Meiningen ot Dreissigacker (DE)

( * ) Notice: Subject to any disclaimer, the term of this patent is extended or adjusted under 35 U.S.C. 154(b) by 412 days.

(21) Appl. No.: 16/161,949

(22) Filed: Oct. 16, 2018

(65) Prior Publication Data
US 2019/0154468 A1    May 23, 2019

(30) Foreign Application Priority Data

Oct. 17, 2017 (EP) .................................... 17196793

(51) Int. Cl.
| | | |
|---|---|---|
| *G01D 5/34* | (2006.01) | |
| *G01D 5/353* | (2006.01) | |
| *G01J 1/42* | (2006.01) | |
| *G08B 13/186* | (2006.01) | |
| *H04B 10/071* | (2013.01) | |
| *G01M 11/00* | (2006.01) | |
| *G08B 17/103* | (2006.01) | |

(52) U.S. Cl.
CPC ....... *G01D 5/3539* (2013.01); *G01D 5/35361* (2013.01); *G01J 1/42* (2013.01); *G08B 13/186* (2013.01); *H04B 10/071* (2013.01); *G01M 11/3145* (2013.01); *G08B 17/103* (2013.01)

(58) Field of Classification Search
CPC ............... G01D 5/3537; G01D 5/3539; G01D 5/35361; G01J 1/42; H04B 10/071; G01M 11/3145
USPC ...................................................... 250/227.14
See application file for complete search history.

(56) References Cited

U.S. PATENT DOCUMENTS

| | | | |
|---|---|---|---|
| 5,359,405 A | 10/1994 | Andrews | |
| 5,991,479 A * | 11/1999 | Kleinerman | G01J 5/08 385/31 |

(Continued)

FOREIGN PATENT DOCUMENTS

WO    WO 2010/116119 A2    10/2010

OTHER PUBLICATIONS

Communication of the Extended European Search Report for European Patent Application Serial No. 17196793.8 (dated Jun. 19, 2018).

(Continued)

*Primary Examiner* — Kevin K Pyo
(74) *Attorney, Agent, or Firm* — Jenkins, Wilson, Taylor & Hunt, P.A.

(57) ABSTRACT

A system 1 for remote sensing of information to be transmitted, said system 1 comprising; an optical time-domain reflectometer, OTDR, 2 adapted to transmit an optical probe signal OPS into an optical fiber 3 and to measure a backscattered signal power; and at least one electro-optical signaling unit 4 connected to said optical fiber 3, wherein the electro-optical signaling unit 4 is configured to change an attenuation and/or a reflection of the optical probe signal OPS depending on at least one signal provided by one or more signal sources 5 in response to the information to be transmitted.

20 Claims, 19 Drawing Sheets

(56) References Cited

U.S. PATENT DOCUMENTS

| | | | |
|---|---|---|---|
| 2013/0056197 A1 | 3/2013 | Maida et al. | |
| 2014/0175271 A1 | 6/2014 | Samson et al. | |
| 2015/0377655 A1* | 12/2015 | Dorfman | G01D 5/35367 |
| | | | 250/227.14 |
| 2017/0350734 A1* | 12/2017 | Ji | G01D 5/35306 |

OTHER PUBLICATIONS

Communication of the Partial European Search Report for European Patent Application Serial No. 17196793.8 (dated Apr. 24, 2018).

Aref et al., "Fiber optic Fabry-Perot pressure sensor with low sensitivity to temperature changes for downhole application," Optics Communications, vol. 269, pp. 322-330 (2007).

"Optical time-domain reflectometer," Wikipedia, pp. 1-4 (Jan. 23, 2021).

"Distributed acoustic sensing," Wikipedia, pp. 1-5 (Oct. 26, 2020).

* cited by examiner

REMOTE SENSING SYSTEM

PRIORITY CLAIM

This application claims the benefit of European Patent Application No. 17196793.8, filed Oct. 17, 2017, the disclosure of which is incorporated herein by reference in its entirety.

TECHNICAL FIELD

The invention relates to a method and system for remote sensing of information such as sensor information.

BACKGROUND

In many applications it is necessary to provide remote sensing of information provided by signal sources such as sensors. For instance infield sensors can provide information for a processing unit which evaluates the received sensor information data. These infield sensors are mostly passive sensors which can generate information depending on changes in their environment. Most passive sensors are designed to work in a spectroscopy system. These sensors are commonly based on fiber Bragg gratings which can reflect light received from a white noise source. A spectral shape of the reflection commonly identifies a kind of state of the respective sensor. However, a spectroscopy based system is quite complex and not adapted for many infield applications. Moreover, a conventional spectroscopy system cannot localize the signal sources along an optical fiber used for transmitting the information data. Moreover, in a spectroscopy system every signal source or sensor does use a different central wavelength for transmitting information as the spectral reflectance would otherwise overlap.

SUMMARY

Accordingly it is an object of the present invention to provide a method and system for remote sensing of information which has a comparatively low complexity and which allows to localize signal sources along an optical fiber.

This object is achieved according to a first aspect of the present invention by a system having the features of claim 1.

The invention provides according to the first aspect a system for remote sensing of information to be transmitted, said system comprising:
an optical time-domain reflectometer, adapted to transmit an optical probe signal into an optical fiber and to measure a backscattered signal power; and
at least one electro-optical signaling unit connected to said optical fiber, wherein the electro-optical signaling unit is configured to change an attenuation and/or a reflection of the optical probe signal depending on at least one signal provided by one or more signal sources in response to the information to be transmitted.

In an embodiment of the system according to the first aspect of the present invention the electro-optical signaling units form in-line electro-optical signaling units located at different positions along the optical fiber, wherein each electro-optical signaling unit comprises an actuator adapted to change directly an attenuation and/or a reflection of the optical probe signal transported through said optical fiber.

In a possible embodiment of the system according to the first aspect of the present invention a spatial distribution of the in-line electro-optical signaling units along said optical fiber is transformed in a corresponding time-multiplexing of the optical signal received by said optical time-domain reflectometer.

In a further possible embodiment of the system according to the first aspect of the present invention the electro-optical signaling unit is adapted to provide a multilevel optical signal and/or a time encoded optical signal depending on the signal received from the at least one signal source.

In a further possible embodiment of the system according to the first aspect of the present invention the signal sources comprise sensors adapted to provide signals in response to information to be transmitted, in particular in response to environmental changes.

In a further possible embodiment of the system according to the first aspect of the present invention the signal sources are adapted to provide signals in response to device-relevant information of associated devices, in particular a serial number or identifier of the respective device.

In a further possible embodiment of the system according to the first aspect of the present invention the at least one signal source is connected to the electro-optical signaling unit via a wired connection.

In a further possible alternative embodiment of the system according to the first aspect of the present invention the at least one signal source is connected to the electro-optical signaling unit via a wireless connection.

In a further possible embodiment of the system according to the first aspect of the present invention the at least one signal source is connected via a wired or wireless connection to a processor of said electro-optical signaling unit adapted to process the wired or wireless signals received from the signal sources and adapted to control an actuator of said electro-optical signaling unit to change the attenuation and/or reflection of the optical probe signal depending on the processed signals.

In a further possible embodiment of the system according to the first aspect of the present invention the actuator of said electro-optical signaling unit is adapted to change an attenuation and/or a reflection of the optical probe signal transported in said optical fiber or branched off from said optical fiber by an optical coupler.

In a still further possible embodiment of the system according to the first aspect of the present invention the actuator of the electro-optical signaling unit is adapted to control a gap of said optical fiber depending on the signals received from the signal sources.

In a still further possible embodiment of the system according to the first aspect of the present invention the actuator is a piezo actuator adapted to adjust the gap along said optical fiber.

In a further possible alternative embodiment of the system according to the first aspect of the present invention the actuator is a piezo actuator adapted to move a filter across a gap of said optical fiber.

In a further possible embodiment of the system according to the first aspect of the present invention the actuator of said electro-optical signaling unit comprises an LCD actuator.

In a further possible embodiment of the system according to the first aspect of the present invention the actuator of said electro-optical signaling unit comprises an e-ink actuator.

In a further possible embodiment of the system according to the first aspect of the present invention the actuator of said electro-optical signaling unit comprises a MEMS actuator.

In a still further possible embodiment of the system according to the first aspect of the present invention the actuator of said electro-optical signaling unit comprises an electric-optic modulator.

In a further possible embodiment of the system according to the first aspect of the present invention the one or more signal sources and/or the actuators are powered electrically by a local power source.

In a still further possible embodiment of the system according to the first aspect of the present invention the local power source comprises an energy storage unit configured to store electrical power.

In a further possible embodiment of the system according to the first aspect of the present invention the local power source comprises an energy harvester configured to harvest electrical power from the environment.

In a still further possible embodiment of the system according to the first aspect of the present invention the local power source comprises an energy converter configured to convert optical power into electrical power.

In a further possible embodiment of the system according to the first aspect of the present invention the energy harvester is configured to harvest electrical power from environmental energy to detect an intrusion.

In a still further possible embodiment of the system according to the first aspect of the present invention the energy converter is configured to convert optical power of an optical signal received from a light source via said optical fiber at a wave pump wavelength or received via a separate optical fiber into electrical power.

In a further possible embodiment of the system according to the first aspect of the present invention the electrical power harvested by said energy harvester and/or provided by said energy converter is accumulated over time and stored in an energy storage unit to power the actuators and/or the signal sources.

In a still further possible embodiment of the system according to the first aspect of the present invention the environmental energy harvested by the energy harvester comprises mechanical energy of a mechanical object.

In a still further possible embodiment of the system according to the first aspect of the present invention the sensors are adapted to monitor an intrusion, a humidity within the environment, a temperature of the environment, a pressure in the environment, a presence of a fluid or gas in the environment, a mechanical tension or force, a light or signal in the environment, a tilt of an object, presence of smoke and/or fire in the environment and/or a thermal expansion.

In a still further possible embodiment of the system according to the first aspect of the present invention the actuators comprise latching actuators which consume electrical power only in the moment of activation and deactivation.

Further, the present invention provides according to a second aspect a method for remote sensing of information comprising the features of claim 21.

The invention provides according to the second aspect of the present invention a method for remote sensing of information to be transmitted, the method comprising the steps of:
transmitting by an optical time-domain reflectometer an optical probe signal via an optical fiber,
changing an attenuation and/or a reflection of the optical probe signal transported through said optical fiber depending on information to be transmitted and
measuring the backscattered optical signal by the optical time-domain reflectometer connected to said optical fiber to sense the information to be transmitted.

In a possible embodiment of the method according to the second aspect of the present invention the attenuation and/or reflection of the optical probe signal transported through said optical fiber is changed depending on at least one signal provided by one or more signal sources in response to the information to be transmitted.

In a further possible embodiment of the method according to the second aspect of the present invention the information to be transmitted comprises environmental changes transformed by corresponding sensors as signal sources into sensor signals, wherein the attenuation and/or reflection of the optical probe signal transported through said optical fiber is changed depending on the sensor signals representing the environmental changes.

In a still further possible embodiment of the method according to the second aspect of the present invention the information to be transmitted comprises device information of one or more devices connected to said optical fiber.

BRIEF DESCRIPTION OF THE DRAWINGS

In the following possible embodiments of the different aspects of the present invention are described in more detail with reference to the enclosed figures.

DETAILED DESCRIPTION

Figure 1:
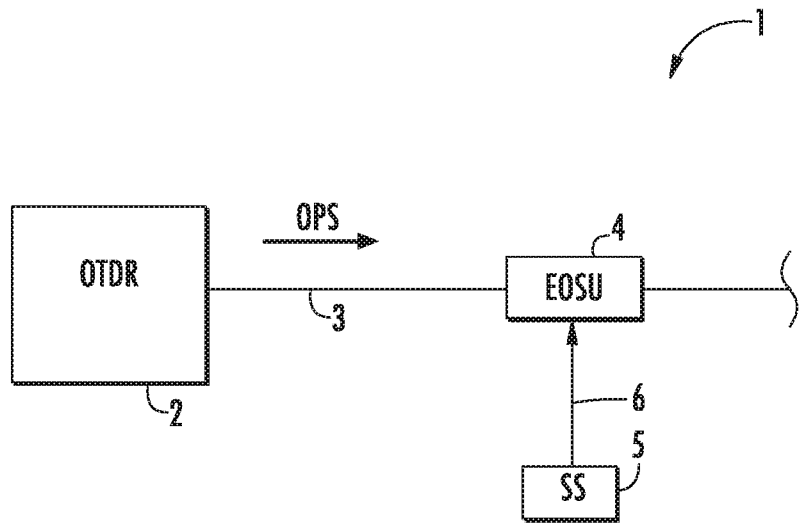
FIG. 1 shows a block diagram of a possible exemplary embodiment of a system for remote sensing of information according to the first aspect of the present invention.

As can be seen in FIG. 1 a system 1 for remote sensing of information to be transmitted according to the first aspect of the present invention comprises in the illustrative embodiment an optical time-domain reflectometer 2 which is adapted to transmit an optical probe signal OPS into an optical fiber 3 and to measure a backscattered signal power received via the optical fiber 3. The system 1 comprises at least one electro-optical signaling unit 4 connected to the optical fiber 3. The electro-optical signaling unit 4 is configured to change an attenuation and/or a reflection of the optical probe signal OPS transmitted through the optical fiber 3 depending on at least one signal provided by one or more signal sources 5 connected to the electro-optical signaling unit 4 via signal line 6 as illustrated in FIG. 1. The electro-optical signaling unit 4 is adapted to change an attenuation and/or a reflection of the optical probe signal OPS depending on the signal generated by the signal source 5 in response to the information to be transmitted. The electro-optical signaling unit 4 can be adapted to provide a multilevel optical signal and/or a time encoded optical signal depending on the signal received from the at least one signal source 5. In a further embodiment the signal source 5 can be formed by a sensor adapted to provide a signal in response to information to be transmitted, in particular in response to environmental changes around the sensor. In an alternative embodiment the signal source can also be adapted to provide signals in response to a device-relevant information of an associated device, for example a serial number or identifier of the respective device. In the illustrated embodiment of FIG. 1 the signal source 5 is connected to the electro-optical signaling unit 4 via a wired connection formed by the signal line 6. In an alternative embodiment signal source 5 can also be connected to the electro-optical signaling unit 4 via a wireless connection. In a possible embodiment the signal source 5 can be connected via the wired or wireless connection to a processor of the electro-optical signaling unit 4. The processor of the electro-optical signaling unit 4 can be adapted to process the wired or wireless signals received from the one or more signal sources 5 and can be adapted to control an actuator of the electro-optical signaling unit 4 to change an attenuation and/or a reflection of the optical probe signal OPS received from the optical time-domain reflectometer 2 via the optical fiber 3 depending on the processed signals.

The optical time-domain reflectometer 2 as illustrated in the embodiment of FIG. 1 can comprise an opto-electronic instrument which can also be used to characterize the optical fiber 3. By the optical time-domain reflectometer short optical pulses can be transmitted into the optical fiber 3 and the backscattered power of the signal can be measured as a function of time. From the recorded time trace a spatial distribution of backscattering and attenuation can be derived. As the backscattered power P can be relatively low and is distributed over time an optical time-domain reflectometer 2 comprises a sensitive receiver. For this purpose it is possible to use an avalanche photodiode APD as a receiving element of the optical time-domain reflectometer 2. A strength of the returned optical pulses can be measured and integrated as a function of time. The OTDR 2 can comprise in a possible embodiment a laser which is adapted to generate short optical pulses which can be transmitted in the optical fiber 3. The generated short optical pulses can be sent in a possible embodiment via an optical circulator and a wavelength division multiplexer into the optical fiber 3. The electro-optical signaling unit 4 connected to the optical fiber 3 is configured to change an attenuation and/or a reflection of the optical probe signal OPS depending on the signal provided by the signal source 5 in response to information to be transmitted.

Figure 2:
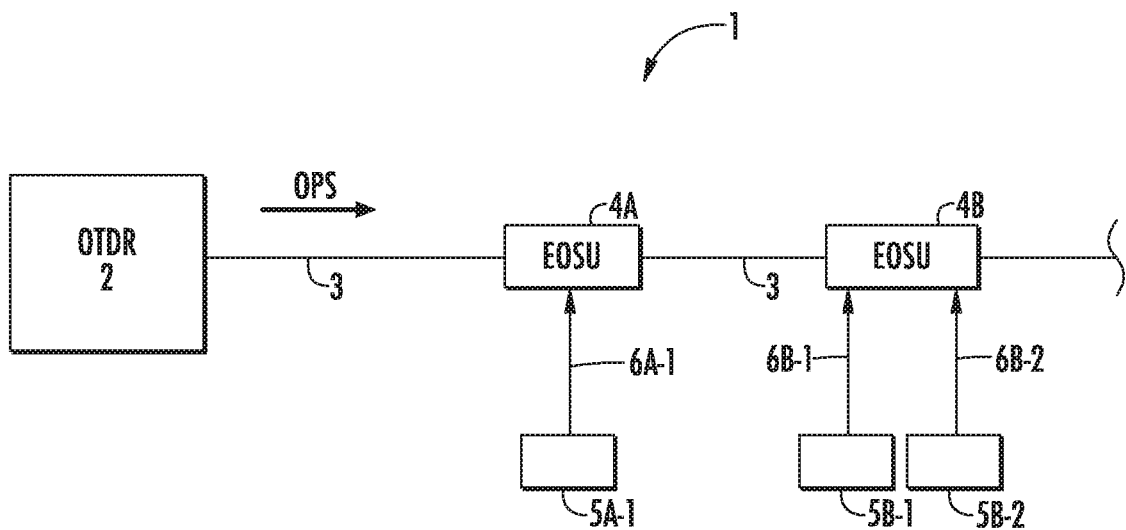
FIG. 2 shows a block diagram of a further possible exemplary embodiment of a system for remote sensing of information according to the first aspect of the present invention.

FIG. 2 shows a block diagram of a further possible exemplary embodiment of the system for remote sensing of information to be transmitted according to the first aspect of the present invention. In the illustrated embodiment of FIG. 2 several electro-optical signaling units 4A, 4B are connected to the optical fiber 3 transporting the optical probe signal OPS generated by the optical time-domain reflectometer 2. The electro-optical signaling units 4A, 4B form in the illustrated embodiment in FIG. 2 in-line electro-optical signaling units which are located at different positions along the optical fiber 3. The number of signal sources 5 of the different electro-optical signaling units 4A, 4B can vary. In the illustrated exemplary embodiment of FIG. 2 a single signal source 5A-1 is connected via signal line 6A-1 to the first electro-optical signaling unit 4A of the system 1. The second electro-optical signaling unit 4B receives signals from two different signal sources 5B-1, 5B-2 via signal lines 6B-1, 6B-2. The signal sources 5 can comprise sensors. Further it is possible that signal sources 5 are formed by data memories storing information to be transmitted to the OTDR 2. This information can comprise device information of an associated device such as a serial number of the respective device. In a further embodiment each electro-optical signaling unit 4 such as the electro-optical signaling units 4A, 4B of the system can comprise an actuator adapted to change directly an attenuation and/or a reflection of the optical probe signal OPS transported through the optical fiber 3 of the system 1. As illustrated in the embodiment of FIG. 2 a spatial distribution of the in-line electro-optical signaling unit 4A, 4B along the optical fiber 3 is transformed in a corresponding time-multiplexing of the optical signal received by a receiving element of the optical time-domain reflectometer OTDR 2.

Figure 3:
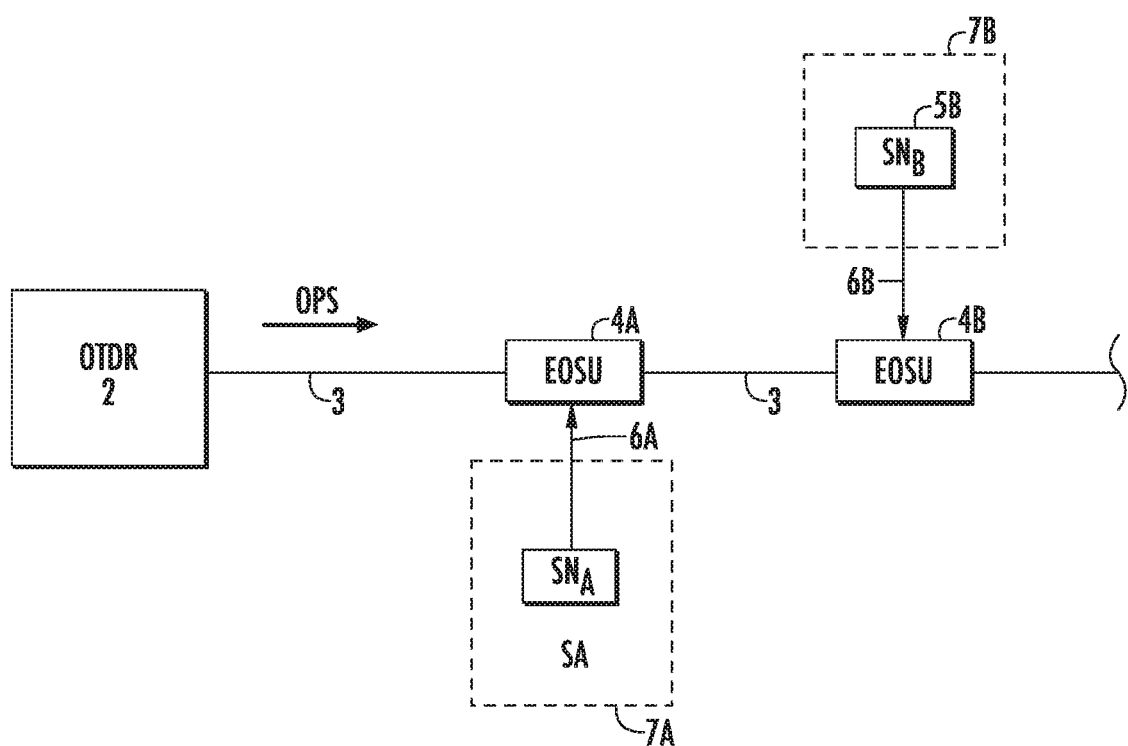
FIG. 3 shows a block diagram of a further possible exemplary embodiment of a system for remote sensing of information according to the first aspect of the present invention.

FIG. 3 shows a first exemplary embodiment of a system for remote sensing of information to be transmitted according to the first aspect of the present invention. As illustrated in the exemplary embodiment of FIG. 3 the system 1 comprises two devices 7A, 7B connected to an associated electro-optical signaling unit 4A, 4B of the system 1. In the illustrated embodiment of FIG. 3 signal sources 5A, 5B are formed by local memories storing device information to be transmitted. The device information can comprise for instance a serial number SN of the respective device 7A, 7B. In the illustrated embodiment a serial number SNa of device 7A and serial number SNb of device 7B can be transmitted as information for remote sensing through the optical fiber 3. It is also possible that each device 7A, 7B comprises associated sensors as additional signal sources providing information about the environment of the respective device 7A, 7B. Accordingly, the illustrated embodiment of FIG. 3 provides information data concerning the respective device 7A, 7B such as an identification number or a serial number can be transported through the optical fiber 3 along with additional sensor data concerning the respective device 7A, 7B for remote sensing or detection by a receiving element of the OTDR 2 of the system 1. As illustrated in the embodiment of FIG. 3 the local memories storing the relevant device information to be transmitted are connected via a wired link 6A, 6B to the electro-optical signaling unit 4A, 4B of the system. In an alternative embodiment the device information stored in the local memories 5aA, 5B can also be transferred to the electro-optical signaling units 4A, 4B via a local wireless connection. The devices 7A, 7B can form fixed devices connected to the electro-optical signaling units 4A, 4B of the system as illustrated in FIG. 3. In an alternative embodiment at least one of the devices 7A, 7B can also comprise mobile devices providing device information to be transmitted via an electro-optical signaling unit 4 of the system within a predetermined transmission range of the wireless link. In the embodiment illustrated in FIG. 3 each device 7A, 7B comprises an associated electro-optical signaling unit 4A, 4B. In an alternative embodiment several co-located devices can share a common electro-optical signaling unit 4. If the devices are connected to the electro-optical signaling unit 4 via a wireless link all devices within a transmission range of a transceiver of the electro-optical signaling unit 4 can share the same electro-optical signaling unit 4 for transmitting information for remote sensing by the OTDR 2. In a further possible embodiment a device 7 comprising device information to be transmitted can also move along the optical fiber 3, for instance in parallel direction to the optical fiber 3. In a possible exemplary implementation a momentary position or location of the moving device 7 can be transported or notified as device-relevant information via the optical fiber 3 for remote detection by the receiving element of the OTDR 2. In this embodiment the device information to be transmitted comprises the current position of the device 7 and can be provided to electro-optical signaling units 4 via a wireless link.

Figure 4:
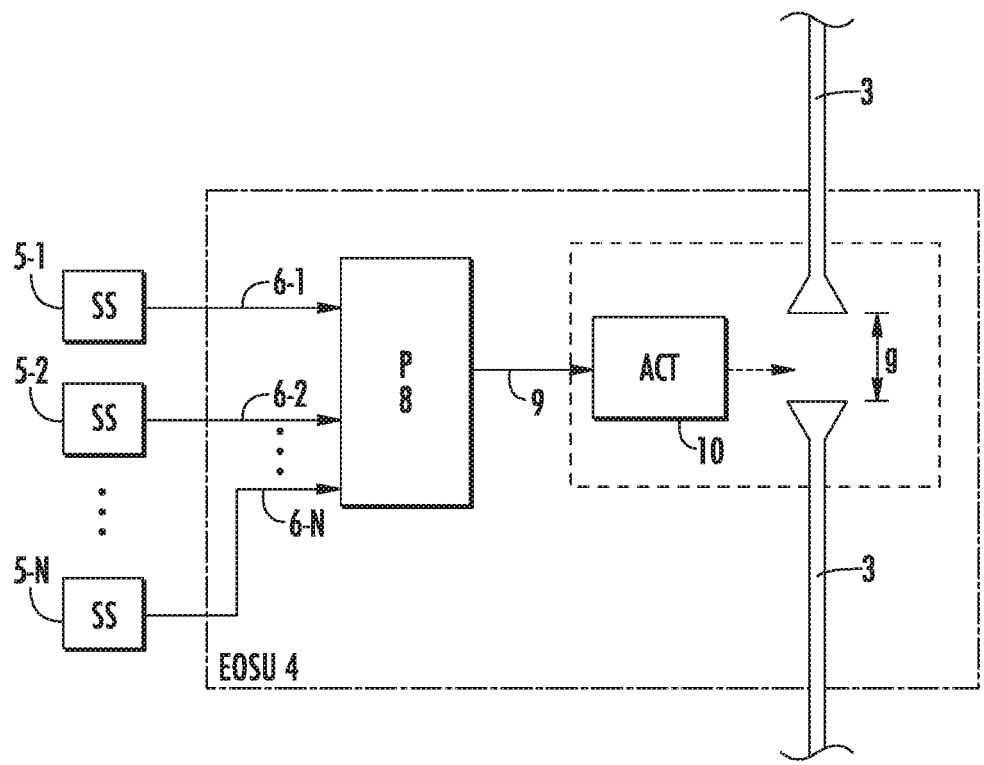
FIG. 4 shows a block diagram of possible exemplary embodiment of an electro-optical signaling unit which can be used in a system for remote sensing of information according to the first aspect of the present invention.

FIG. 4 shows a block diagram of a possible exemplary embodiment of an electro-optical signaling unit 4 which can be used in a system for remote sensing of information according to the first aspect of the present invention. In the illustrated embodiment of FIG. 4 several signal sources 5-1, 5-2 . . . 5-n are connected via wired or wireless connection to a processor 8 of the electro-optical signaling unit 4. The processor 8 is adapted to process the wired or wireless signals received from the different signal sources 5-i. The processor 8 is adapted to control an actuator 10 via an internal signal line 9 as illustrated in FIG. 4. The processor 8 can process the received signals of the signal sources 5 and does control the actuator 10 of the electro-optical signaling unit 4 in a possible embodiment to change the attenuation and/or reflection of an optical probe signal OPS depending on the processed signals. In a possible implementation the actuator 10 can comprise a piezo actuator which is adapted to adjust a gap along the optical fiber 3 as shown in FIG. 4. The gap can comprise a distance g between tapered ends of optical fiber sections 3 as shown in FIG. 4. The gap can comprise for instance a distance of several micrometers. In the illustrated embodiment of FIG. 4 the piezo actuator 10 adapts the gap distance d along the optical fiber 3 in response to the control signal received from the processor 8 of the electro-optical signaling unit 4. In a further alternative embodiment the actuator 10 can also be used to move a filter element across the gap of the optical fiber 3. The information to be transmitted can be encoded. The actuator 10 of the electro-optical signaling unit 4 can be implemented by different kinds of actuators. These actuators can comprise an LCD actuator, an e-Ink actuator, a MEMS actuator and/or an electro-optic modulator.

Figure 5:
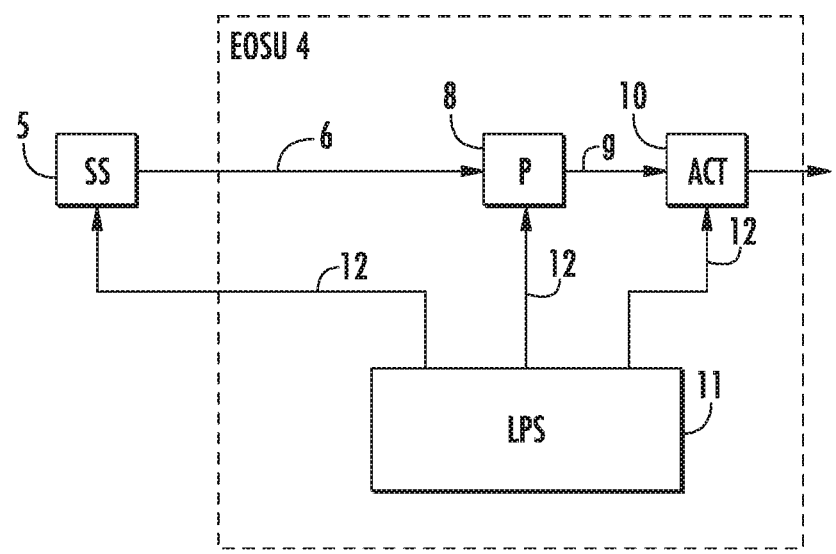
FIG. 5 shows block diagram of a possible exemplary embodiment of an electro-optical signaling unit which can be used in a system for remote sensing of information according to the first aspect of the present invention.

FIG. 5 shows a block diagram of a further possible exemplary embodiment of an electro-optical signaling unit 4 which can be used in a system for remote sensing of information or data according to the first aspect of the present invention. In the illustrated embodiment of FIG. 5 the electro-optical signaling unit 4 comprises a local power source 11. The one or more signal sources 5 connected to the electro-optical signaling unit 4 can be powered in a possible embodiment electrically by the local power source 11 of the electro-optical signaling unit 4. Further, in a possible embodiment the processor 8 of the electro-optical signaling unit 4 as well as the actuator 10 of the electro-optical signaling unit 4 can be powered electrically by the local power source 11 as shown in FIG. 5.

The local power source 11 can comprise different kinds of power sources. In a possible implementation the local power source 11 is formed by an energy storage unit configured to store electrical power. In a further alternative embodiment the local power source can comprise an energy harvester configured to harvest electrical power from the environment. The energy harvester can be configured to harvest electrical power from environmental energy, for instance to detect an intrusion. The energy converter forming a local power source 11 can also be configured to convert optical power of an optical signal received from a light source via the optical fiber 3 at a wave pump wavelength. Further, the energy converter can also be configured to convert optical power of an optical signal received via a separate optical fiber into electrical power used to power the signal source 5 and/or the processor 8 and/or the actuator 10. In a possible embodiment the electrical power harvested by an energy harvester and/or provided by an energy converter can be accumulated over time and stored in an energy storage unit to power the actuators and/or the signal sources. The environmental energy harvested by an energy harvester forming a local power source 11 can comprise mechanical energy of a mechanical object, for instance a lid of a manhole.

The signal sources 5 connected to the electro-optical signaling unit 4 can comprise sensors which are adapted to monitor environmental changes in the vicinity of the respective sensor. In a possible embodiment the sensors can be adapted to monitor an intrusion. Further, the sensors can be adapted to monitor the humidity within the environment, a temperature of the environment or a pressure in the environment. Further, the sensors can be adapted to monitor the presence of a fluid or gas in the environment of the sensor. In other alternative embodiments the sensors can comprise sensors to monitor a mechanical tension of force. Further, the sensors can be adapted to monitor a light or signal in the environment of the sensor. In a further alternative embodiment the sensors are adapted to sense a tilt of an object. Further, the sensors can be configured to monitor a presence of smoke and/or fire in their environment. In a further possible embodiment the sensors can be adapted to monitor a thermal expansion of an object.

The actuator 10 of the electro-optical signaling unit 4 can comprise in a preferred embodiment a latching actuator which does consume electrical power only in the moment of its activation or deactivation.

Figure 6:
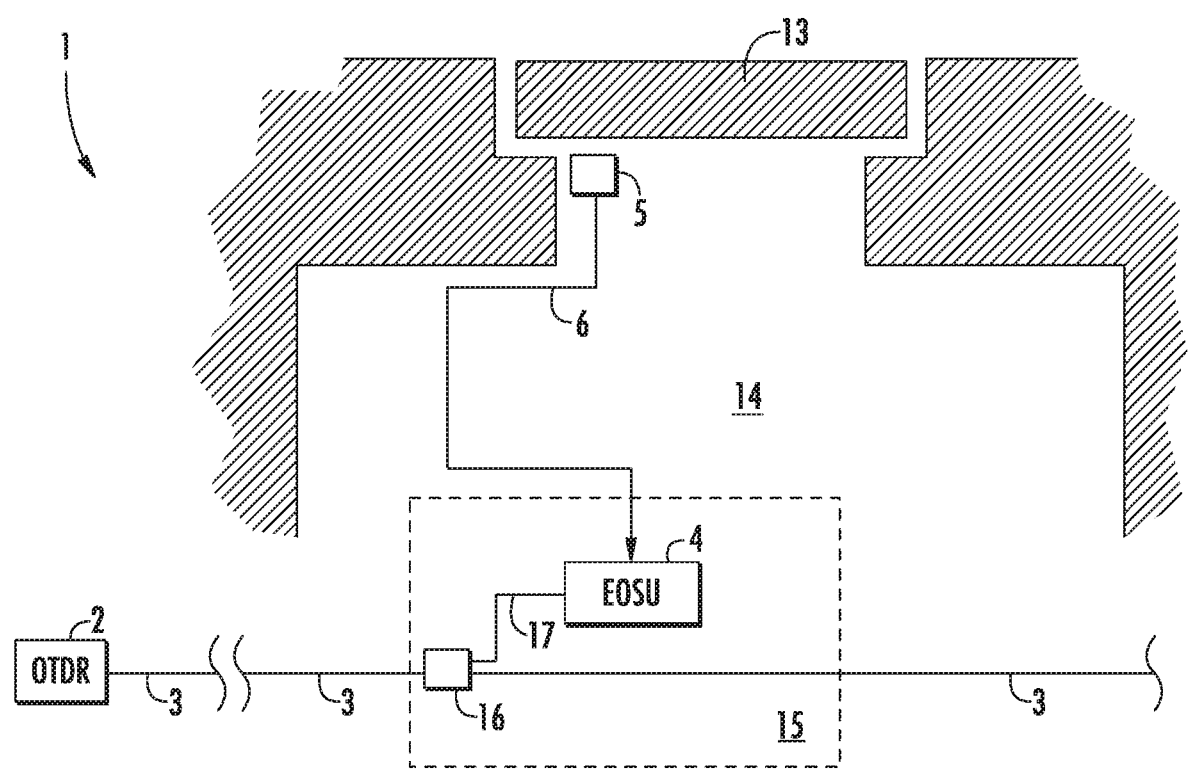
FIG. 6 is a schematic diagram for illustrating a possible exemplary use case of a system for remote sensing of information according to the first aspect of the present invention.

FIG. 6 shows schematically a further possible exemplary embodiment of a system for remote sensing of information according to the first aspect of the present invention. In the illustrated embodiment the system 1 is used for detection of intrusion. In the specific use case illustrated schematically in FIG. 6 a lid 13 of a manhole 14 is monitored using a system 1 according to the first aspect of the present invention.

In the illustrated embodiment of FIG. 6 the electro-optical signaling unit 4 can be provided in a splice box 15 placed in the manhole 14. The splice box 15 can comprise an optical coupler 16 connecting the electro-optical signaling unit 4 via an optical fiber 3 with a remote end optical time-domain reflectometer 2 as shown in FIG. 6. The electro-optical signaling unit 4 is adapted to change an attenuation and/or reflection of an optical probe signal OPS transported in the optical fiber 3 and branched off from the optical fiber 3 by means of the optical coupler 16. The electro-optical signaling unit 4 is connected via a wired signal line 6 to a sensor 5 forming the signal source. Accordingly, the splice box 15 containing the electro-optical signaling unit 4 can be connected to the signal source 5 via an electrical cable 6. The sensor 5 can be formed in a possible exemplary implementation by an Eolismedia Intrusion Sensor. This sensor can be used to detect whether someone accesses a building or an enclosure such as the manhole 14 shown in FIG. 6. In the embodiment shown in FIG. 6 an optical cable comprising the optical fiber 3 is used for remote sensing is routed to the splice box 15 and can be forwarded to another closure or manhole. The electro-optical signaling unit 4 can comprise a piezo-based actuator 10 which is also located within the splice box 15 shown in FIG. 6. The electro-optical signaling unit 4 can be activated with electrical energy. In a possible implementation a capacitor can be added to make sure that upon activation it takes a certain time before the electro-optical signaling unit 4 is reset. The electro-optical signaling unit 4 can be activated in response to received electrical energy generated by an energy harvester forming a local power source 11 as illustrated in the embodiment of FIG. 5. In a possible embodiment the signal source 5 can be formed itself by an energy harvester to detect an intrusion. In the use case of FIG. 6 the signal source 5 connected via the electrical cable 6 to the electro-optical signaling unit 4 within the splice box 15 is an energy harvester. The energy harvester 5 is adapted to transform mechanical energy into electrical energy and can be used to power components of the electro-optical signaling unit 4, in particular an actuator 10 of the electro-optical signaling unit 4 to change an attenuation and/or reflection of an optical probe signal OPS transported through the optical fiber 3 and branched off from the optical fiber 3 by the optical coupler 16. In the illustrated embodiment the optical system is decoupled from the detection sensor, i.e. the energy harvester 5 forming a signal source is implemented as an intrusion detection sensor. When the lid 13 of the manhole 14 is lifted mechanical energy caused by this lifting action is transformed by the energy harvester 5 of the system 1 as illustrated in FIG. 6 into electrical energy to drive an electrically powered actuator 10 of the electro-optical signaling unit 4, for instance to control the gap of the branched off optical fiber causing a change of the attenuation and/or reflection of the optical probe signal OPS generated by the OTDR 2 and transported through the optical fiber 3 and the branched off optical fiber portion 17 within the splice box 15 connecting the electro-optical signaling unit 4 with the optical coupler 16. In a possible embodiment the actuator 10 of the electro-optical signaling unit 4 shown in FIG. 6 can be formed by a piezo actuator which may receive directly electrical energy via the electric cable 6 from the energy harvester 5 acting as an intrusion sensor. The intrusion sensor 5 transforms the mechanical lifting energy by lifting the lid 13 into electrical energy used for driving the piezo actuator 10 to control a gap of the branched off optical fiber 17. When the lid 17 is lifted the gap of the branched off optical fiber 17 is changed by the actuator 10 receiving an electrical current from the energy harvesting sensor 5 through the electrical cable 6. As a consequence of the changed gap of the branched off optical fiber section 17 an attenuation and/or a reflection of an optical probe signal OPS is changed and this change can be detected by receiving element of the optical time-domain reflectometer OTDR 2 to detect the intrusion into the manhole 14. The advantage of the embodiment as illustrated in FIG. 6 is that a simple electrical cable 6 can be used for connecting the splice box 15 with the energy harvesting sensor 5 attached to the lid 13. It is significantly easier to install an electrical cable 6 than an optical cable. Furthermore, several energy harvesting sensors 5 can be installed in parallel. The energy harvesting sensors 5 can also comprise energy harvesting sensors adapted to transform chemical energy into electrical energy. Alternatively, the energy harvesting sensors 5 can also be used to transform solar or radiation energy into electrical energy. For instance the energy harvesting sensor 5 can also be formed by a solar panel adapted to receive sun rays and this energy is transformed into an electrical current used for supplying the actuator 10 of the electro-optical signaling unit 4. The energy harvesting sensor 5 can also comprise a unit adapted to transform energy generated during a chemical reaction into electrical supply energy used for supplying an actuator 10 of the electro-optical signaling unit 4. Energy harvesting signal sources 5 of different kinds can be installed in parallel and connected via electrical signal lines or cables 6 to an electro-optical signaling unit 4 of the system. It is for instance possible to install a solar panel forming a first energy harvesting signal source 5 as well as a chemical energy harvesting signal sources 5 at a single enclosure. If one of the energy harvesting signal sources 5 does generate sufficient electricity the actuator 10 of the electro-optical signaling unit 4 can be activated automatically to change the attenuation and/or reflection of the optical probe signal OPS. As the energy harvesting signal sources are relatively simple devices the complexity of the system is reduced.

In some applications it may be necessary to monitor the electrical cable 6 that connects the energy harvesting sensors 5 and the splice box 15. In the system according to the present invention it is possible to detect when someone tampers with the infrastructure. In case an intentional cut of the electrical cable 6 is detected the system may in that case generate an alarm. In a possible embodiment each sensor can be continuously powered by electrical storage units such as a battery or by a converter unit converting light into electrical energy.

Figure 7:
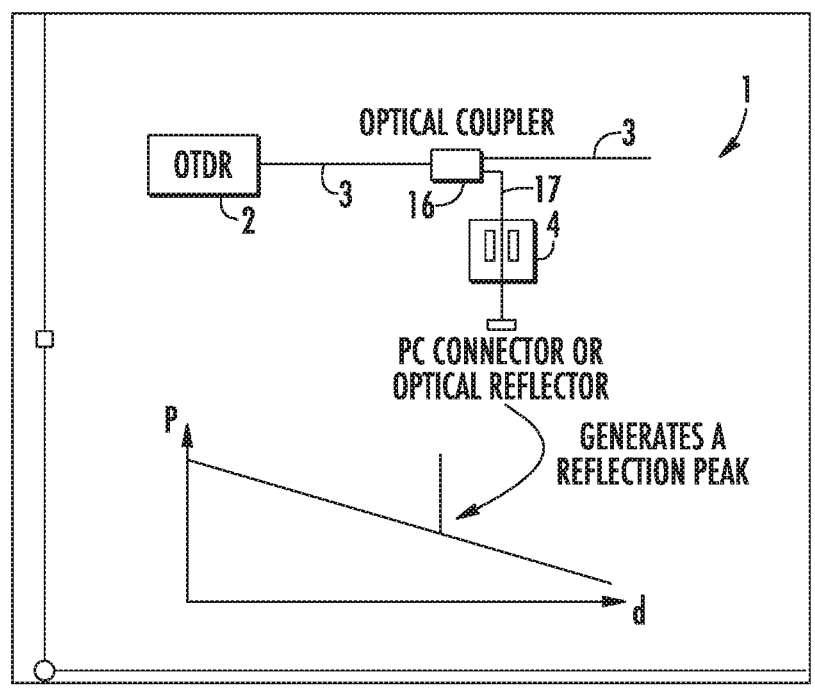
FIGS. 7, 8 show a further possible exemplary embodiment of a system for remote sensing of information according to the first aspect of the present invention.
Figure 8:
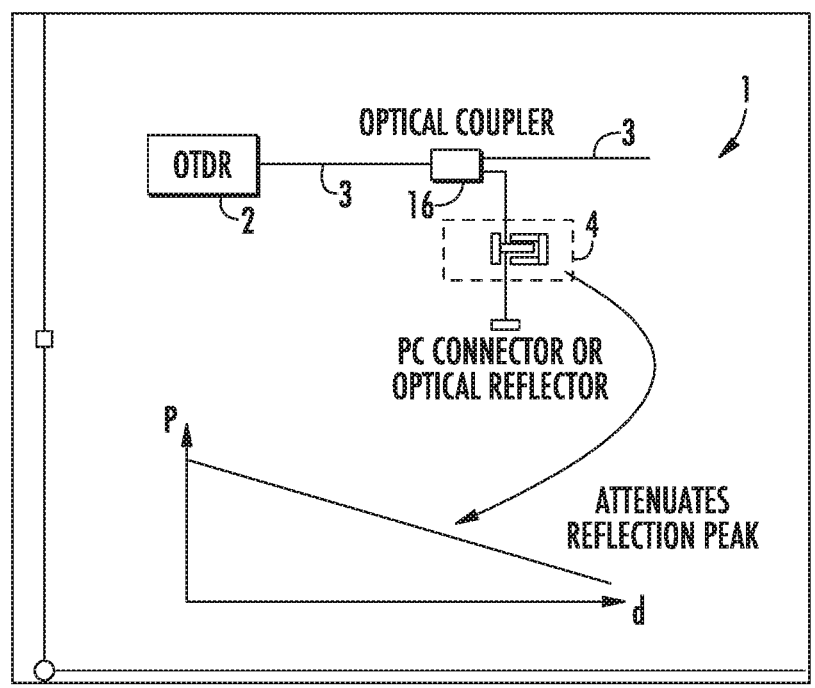

FIGS. 7, 8 show a further exemplary embodiment of a system for remote sensing of information according to the first aspect of the present invention. In the illustrated exemplary embodiment the electro-optical signaling unit 4 is coupled to the optical fiber 3 via an optical coupler 16 and is placed in a secondary branched off fiber section 17 connected to the optical coupler 16. The electro-optical signaling unit 4 is adapted in the illustrated embodiment of FIGS. 7, 8 to change a reflection of an optical probe signal OPS generated by the OTDR 2 transported through the optical fiber 3 and branched off from the optical fiber 3 by means of the optical coupler 16 into the branched off optical fiber section 17. The optical coupler 16 can comprise a passive optical coupler used to split a part of the received optical signal into the secondary branch 17. In a possible exemplary embodiment a 95/5% passive optical coupler 16 can be used. At the end of the secondary branch 17 an optical reflector 18 or a polished PC connector 18 is placed so that the optical signal or light is reflected back towards the OTDR 2. The electro-optical signaling unit 4 can comprise in a possible implementation an actuator 10 which is adapted to mechanically bend the optical fiber of the secondary branch fiber 17 in response to a signal provided by a signal source 5. This signal source can comprise a sensor. The signal source can in a possible embodiment comprise an energy harvesting sensor 5 generating an electrical power for the actuator 10 which bends the fiber of the secondary branched off section 17. This energy harvesting sensor 5 may be adapted to transform a mechanical power into electrical energy used for supplying the actuator 10 of the electro-optical signaling unit 4 shown in FIG. 7. FIG. 7 shows a normal operation mode where the actuator 10 of the electro-optical signaling unit 4 allows the optical signal or light to bypass the electro-optical signaling unit 4 to reach the optical reflector 18 which reflects the optical signal back via the secondary branched off arm 17 and the optical coupler 16 to the OTDR 2. As illustrated schematically in FIG. 7 the optical reflector 18 generates a reflection peak in the backscattered trace signal visible to the receiving element of the OTDR 2. In contrast, FIG. 8 shows a situation where the signal source 5 has triggered an actuator 10 of the electro-optical signaling unit 4 to bend the optical fiber of the branched off secondary arm 17. As a result no optical signal or light of the optical probe signal OPS does hit the optical reflector 18 anymore and no optical reflection peak is visible to the receiving element of the OTDR 2 as illustrated schematically in FIG. 8. Accordingly, in response to the signal provided by the signal source 5 the reflection peak is eliminated or attenuated. In a possible exemplary embodiment the signal source can be formed by an energy harvesting signal source 5 as illustrated in the embodiment of FIG. 6. If a lid 13 of a manhole 14 is lifted the mechanical energy is transformed by the energy harvesting sensor 5 into electrical energy provided as a supply voltage or supply current to an actuator 10 of the electro-optical signaling unit 4 which as a result bends the optical fiber of the secondary branched off fiber section 17 to eliminate the reflection peak. When the reflection peak is eliminated and no longer visible to the receiving element of the OTDR 2 this is an indication that an intrusion of the manhole 14 has occurred. As a consequence the OTDR 2 can trigger an alarm signal. Furthermore, a distance of the electro-optical signaling unit 4 having caused the alarm can be identified by the OTDR 2 on the basis of the backscattered trace. Accordingly, it is not only known that an intrusion has happened but also the location where the intrusion has happened. In a possible embodiment the intrusion sensor 5 can be equipped with a mechanical clock. In this embodiment when a mechanical object such as the lid 13 illustrated in FIG. 6 is opened or lifted only for a short time it will take a predetermined time period for the optical reflection peak to return allowing the OTDR 2 to detect the activated intrusion sensor.

Figure 9:
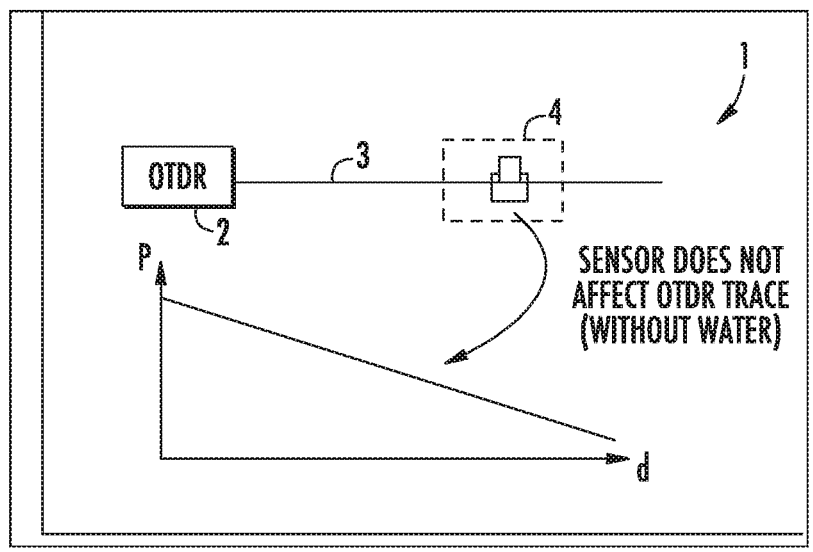
FIGS. 9, 10 show a further exemplary embodiment of a system for remote sensing of information according to the first aspect of the present invention.
Figure 10:
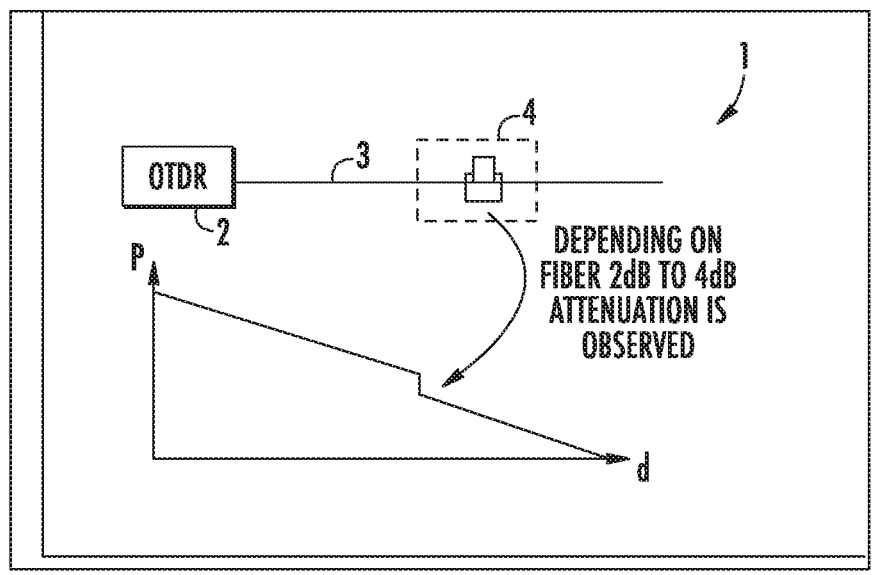

FIGS. 9, 10 show a further exemplary embodiment of a system for remote sensing of information according to the first aspect of the present invention. In the illustrated embodiment the signal source 5 is formed by a specific water sensor. The water sensor can comprise a sponge and a plastic enclosure. Inserting of the optical fiber 3 into the water sensor does not affect the OTDR trace. In a further embodiment if water hits the water sensor 5 connected to the electro-optical signaling unit 4 the sponge in the water sensor 5 can swell up and may press the optical fiber 3 into a plastic enclosure. This plastic enclosure can be formed in a way that the optical fiber 3 is bent causing an attenuation of the optical signal as illustrated in FIG. 10. Depending on the optical fiber 3 an attenuation of e.g. 2 dB to 4 dB can be observed.

The attenuation of the optical probe signal OPS can be detected by the receiving element of the OTDR 2. In a possible embodiment the water sensor can be formed by a passive water sensor which maybe used as a one-time sensor which has to be replaced after activation. However, in case water enters an enclosure a field engineer has to visit the affected site anyway and can replace the water sensor. The water sensor 5 can be replaced by the field engineer without interrupting the optical fiber 3. The water sensor can be mounted in a possible embodiment inside a splicing enclosure.

Figure 11:
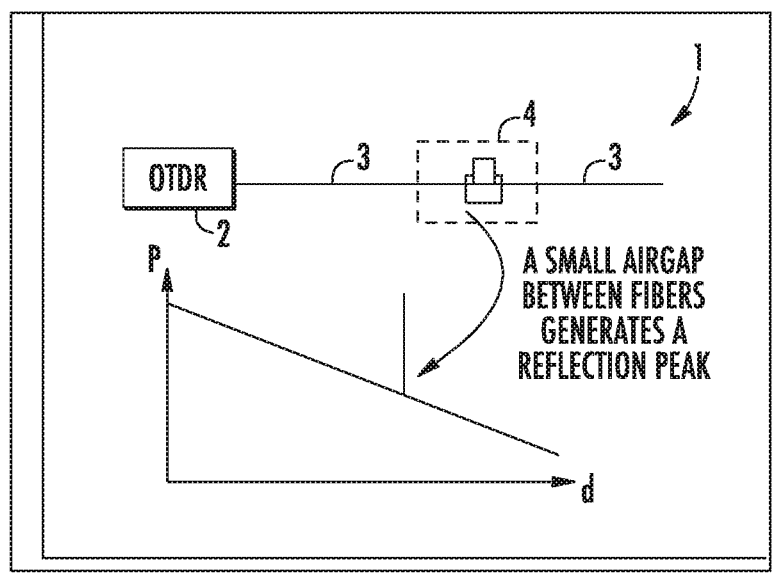
FIGS. 11, 12 show a further exemplary embodiment of a system for remote sensing of information according to the first aspect of the present invention.
Figure 12:
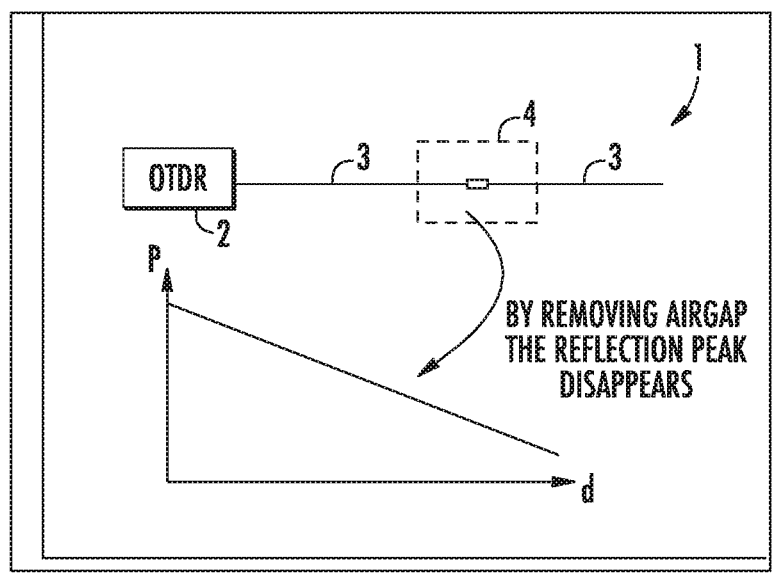

FIGS. 11, 12 show a further exemplary embodiment of a system for remote sensing of information according to the first aspect of the present invention. In the illustrated embodiment of FIGS. 11, 12 the electro-optical signaling unit 4 can comprise an integrated signal source 5 configured to activate an actuator 10 which controls a gap within the optical fiber 3 as illustrated in the embodiment of FIG. 4. Instead of adding an optical coupler and an optical reflector as illustrated in the embodiment of FIGS. 7, 8 the optical reflection is created in the embodiment of FIGS. 9, 10 by inserting an air gap between two sections of the optical fiber 3 as shown in FIG. 4. As long as the two fiber sections of the optical fiber 3 are aligned the insertion loss of the air gap can be low (<1 dB), but up to −14 dB optical reflection can be generated. In order to relax the alignment requirements between the two fiber sections of the optical fiber 3 an optical taper can be used to increase alignment tolerances as illustrated also in the embodiment of FIG. 4. The actuator 10 of the electro-optical signaling unit 4 can be activated and reset using mechanical energy. The air gap that needs to be introduced to generate the reflection can be very small (μm or mm range) and thus the electrical energy that needs to be produced by an energy harvesting sensor 5 to activate the actuator 10 is very low. As illustrated in FIG. 4 a small air gap g between the aligned optical fiber sections 3 can generate a significant reflection peak in the OTDR trace. When removing the air gap by the actuator 10 in response to a supply current generated by an energy harvesting sensor 5 the reflection peak disappears in the OTDR trace as illustrated in FIG. 12.

Figure 13:
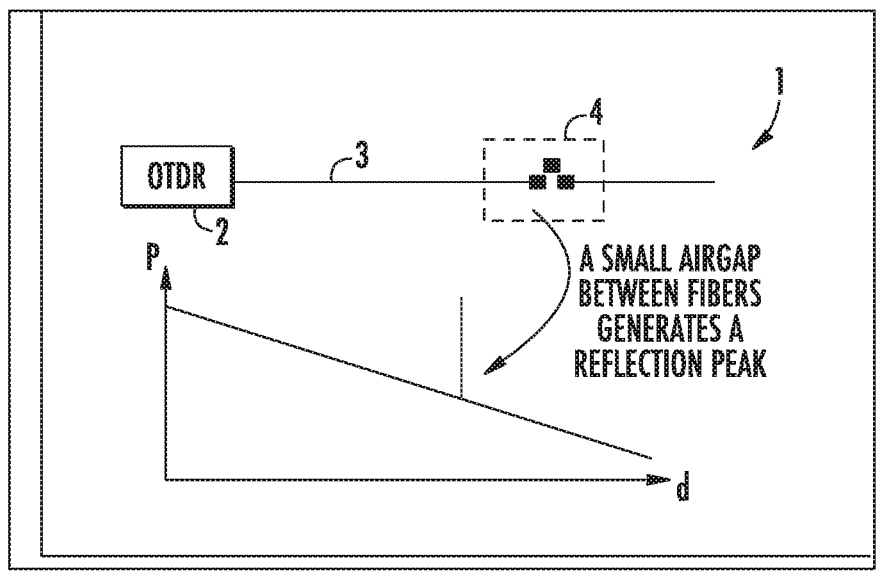
FIGS. 13, 14 show a further exemplary embodiment of a system for remote sensing of information according to the first aspect of the present invention.
Figure 14:
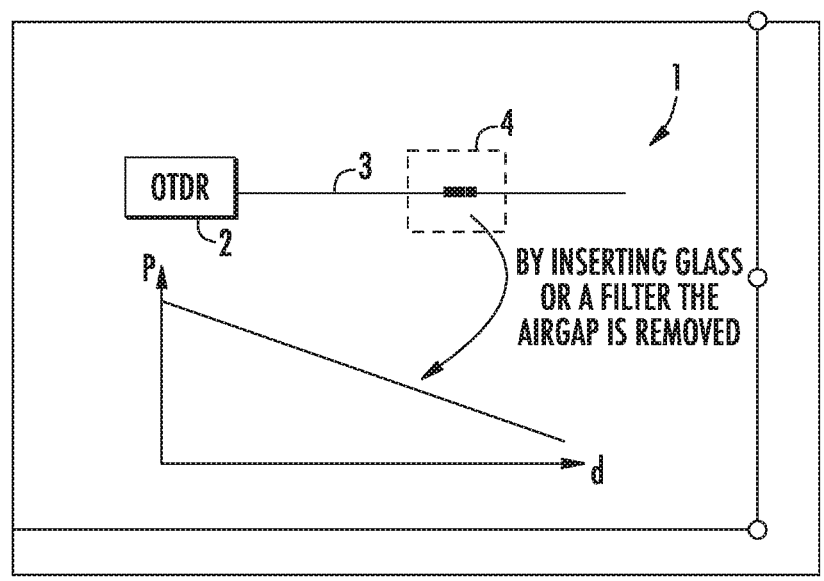

FIG. 13, 14 illustrate a further exemplary embodiment of a system 1 for remote sensing of information according to the first aspect of the present invention. The embodiment illustrated in connection with FIGS. 4, 11, 12 requires a relatively accurate alignment in order to keep the insertion loss low and to get a reproducible result with many activations. This drawback can be overcome by having a fixed alignment between the two opposing optical fiber sections of the optical fiber 3 and by inserting a piece of glass or a filter in between the two optical fiber sections 3. As illustrated in FIG. 13 similar to FIG. 11 a small air gap between the opposing optical fiber sections of the optical fiber 3 generates a visible reflection peak. By moving a glass piece or a filter into the air gap by the actuator 10 in response to a signal received by a signal source 5 the reflection peak (FIG. 13) does disappear as illustrated in the OTDR trace shown in FIG. 14.

Figure 15:
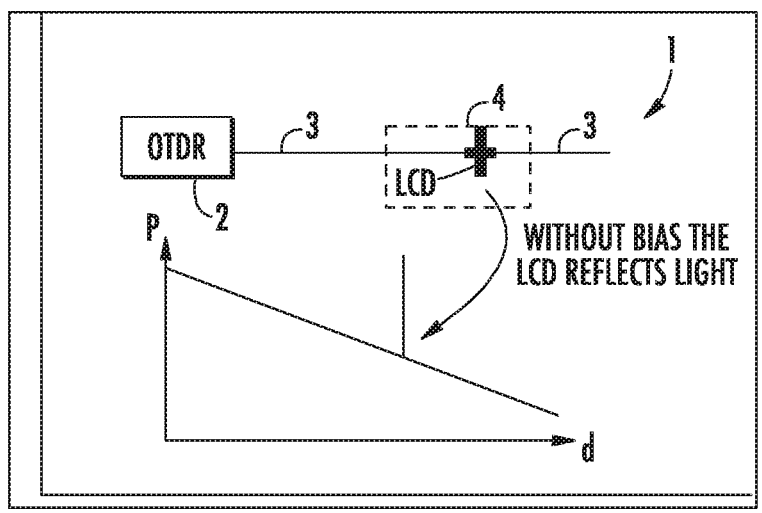
FIGS. 15, 16 show a further exemplary embodiment of a system for remote sensing of information according to the first aspect of the present invention.
Figure 16:
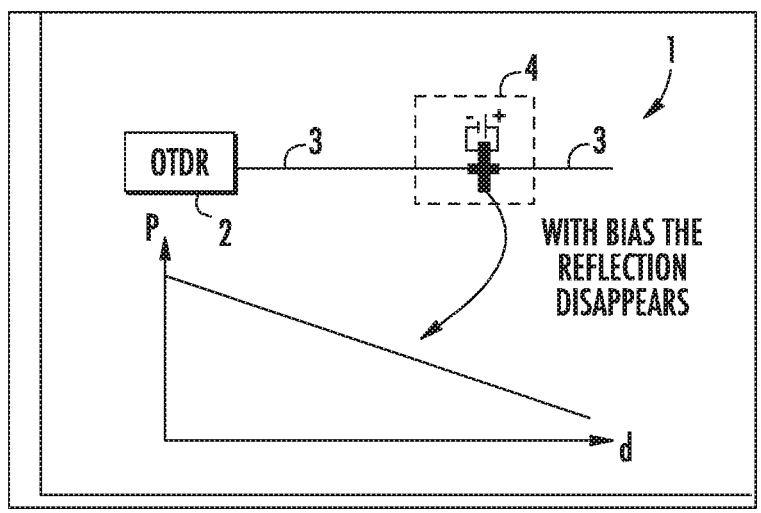

FIGS. 15, 16 illustrate a further exemplary embodiment of a system 1 for remote sensing of information according to the first aspect of the present invention. In the illustrated embodiment of FIGS. 15, 16 the actuator 10 of the electro-optical signaling unit 4 is formed by an LCD actuator. In a possible implementation the LCD is placed in the optical fiber that is to be monitored directly. Without a bias voltage the LCD actuator 10 of the electro-optical signaling unit 4 does reflect part of the light that it receives. As such a reflective event is created on the OTDR trace. In case that a signal source 5 such as a sensor is activated and/or one of the energy harvesting signal sensors does create electrical energy a bias voltage is applied to the LCD screen and consequently the previous reflectance does disappear. When the reflectance disappears this can be for instance indicate that an intrusion has happened. In a possible embodiment a capacitor can be included to make sure that even if the actuator 10 is activated only for a short time the OTDR 2 is still able to detect the event, e.g. the intrusion event. As illustrated in FIG. 15 without a bias voltage the LCD placed in the optical fiber 3 does reflect the light of the optical probe signal OPS back to the receiving element of the OTDR 2. This reflection is visible to the receiving element of the OTDR as a reflection peak as illustrated in the OTDR trace diagram of FIG. 15. If a bias voltage is generated by a signal source 5 connected to the electro-optical signaling unit 4 the reflection peak does disappear as illustrated in the OTDR trace diagram of FIG. 16.

Figure 17:
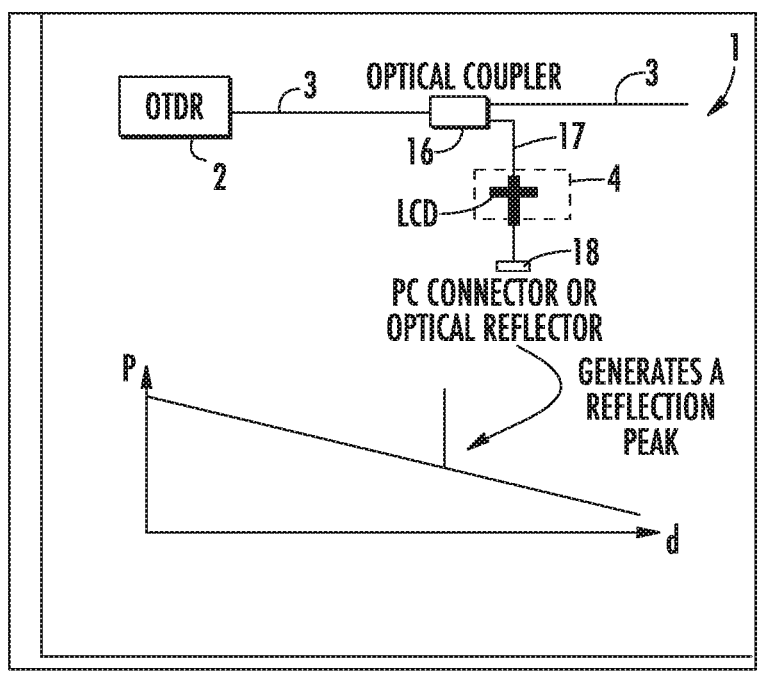
FIGS. 17, 18 show a further exemplary embodiment of a system for remote sensing of information according to the first aspect of the present invention.
Figure 18:
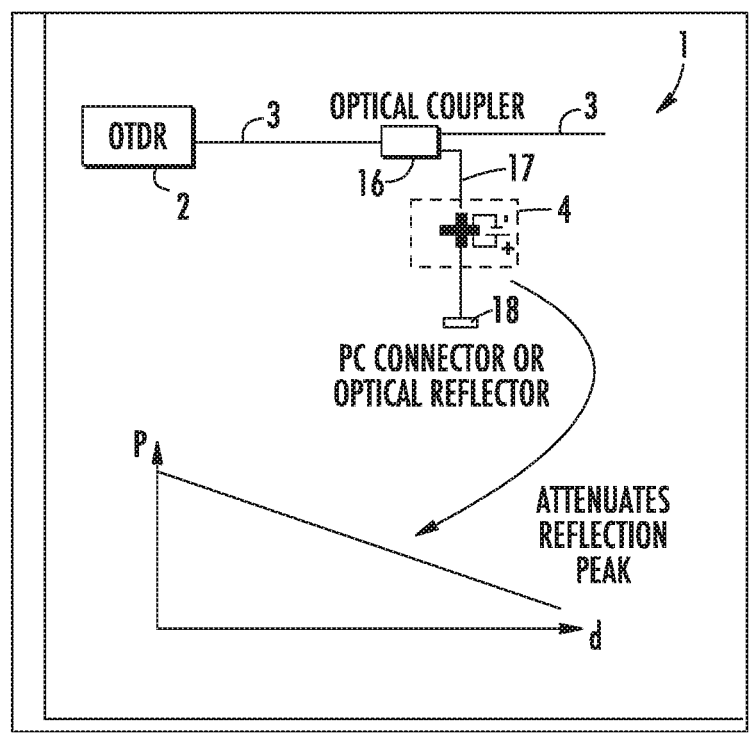

FIGS. 17, 18 show a further exemplary embodiment of a system 1 for remote sensing of information according to the first aspect of the present invention. In this illustrated embodiment of FIGS. 17, 18 the electro-optical signaling unit 4 is connected to the optical fiber 3 via an optical coupler 16. The electro-optical signaling unit 4 comprising the LCD actuator placed in the branched off optical fiber section 17 between the optical coupler 16 and an optical reflector 18 as illustrated in FIG. 17. A capacitor can also be included to make sure that even if the LCD actuator 10 is activated only for a short time the event is still visible in the OTDR trace to detect the triggering event.

Different kind of actuators can be implemented in the electro-optical signaling unit 4. In a possible implementation an e-Ink actuator 10 can be used. An advantage of an e-Ink actuator is that it requires energy only in the moment of its actuation. Every time a sensor is activated the state is inverted. A small capacitor can take care that during a hold-off time no inversion takes place so that the OTDR 2 can detect the change. In a still further possible alternative embodiment the actuator 10 can comprise a MEMS (micro electro mechanical system) element for switched reflection. This implementation requires a low supply voltage.

Figure 19:
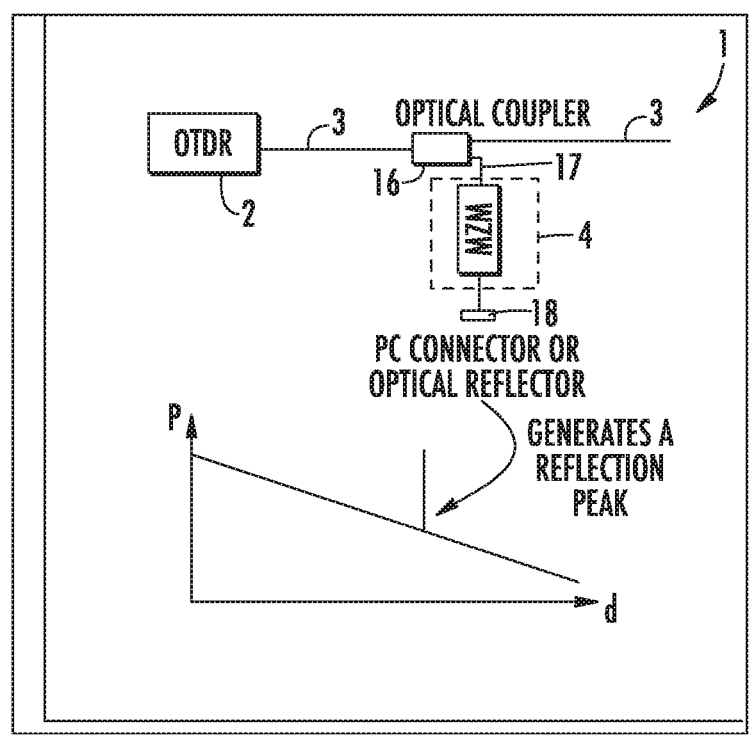
FIGS. 19, 20 show a further exemplary embodiment of a system for remote sensing of information according to the first aspect of the present invention.
Figure 20:
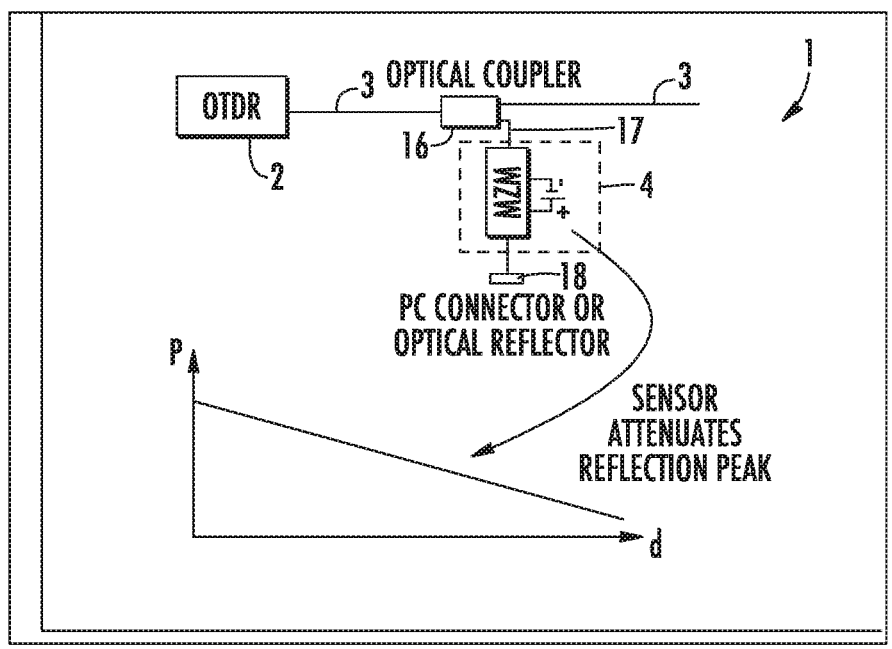

In a still further alternative embodiment the electro-optical signaling unit 4 can comprise an electro-optic modulator EOM. FIGS. 19, 20 illustrate an exemplary embodiment of the system according to the first aspect of the present invention using electro-optic modulators EOM. Electro-optic modulators are optical devices in which a signal controlled element is used to modulate a beam of light. In a Mach-Zehnder modulator MZM the amplitude of a signal can be changed with little electrical energy. As such a MZM can be used as well as an intrusion detector. As illustrated in the embodiment of FIGS. 19, 20 the electro-optical signaling unit 4 comprises a Mach-Zehnder modulator MZM. Without a bias current the MZM provides little attenuation and the reflection peak is visible to the OTDR 2 as illustrated in the OTDR trace of FIG. 19. If a bias voltage is applied to the MZM the reflection peak is attenuated as illustrated in the OTDR trace diagram shown in FIG. 20. Electro-optical modulators MZM can be used to control a phase, frequency, amplitude or polarization of the light beam. As such many different possible variants of this kind of sensing device can be used for different use cases. The signal sources 5 illustrated in the different embodiments can comprise different kind of sensors, in particular passive signal sensors. These sensors can be adapted to monitor an intrusion, the humidity within the environment, a temperature in the environment, a pressure in the environment, presence of a fluid or gas in the environment, a mechanical tension of force, a light or signal in the environment, tilt of an object, presence of smoke and of fire in the environment and/or a thermal expansion. Multiple different signal sources or sensors 5-$i$ can be connected to a processor 8 of an electro-optical signaling unit 4 as illustrated in the embodiment of FIG. 4. The processor 8 can control an actuator 10 via a controller 9 in response to the different sensor data received from the different signal sources or sensors 5-$i$. The evaluation of the sensor data received from same or different kinds of signal sensors 5-$i$ can be performed under control of a configurable evaluation program. Different kind of signal sources can be connected with a common processor 8. The signal sources can be heterogeneous and can comprise for instance signal sources providing device information such as a serial number of a device stored in a local memory or conventional passive sensors providing sensor data information to the processor 8. The signal sources can comprise energy harvesting entities providing as a sensor signal an electrical supply power for the processor 8 or directly to the actuator 10 of the electro-optical signaling unit 4. In a basic implementation signal energy harvesting single source can be directly connected to an actuator 10 driven by an electrical power generated by the energy harvesting signal source to change the attenuation and/or reflection of an optical signal transported through the optical fiber 3 connected to the OTDR 2. In a more complex use case a plurality of different signal sources including sensors, energy harvesting sensors and/or data sources or memories providing information can be connected to a microprocessor 8 evaluating the different information data to provide a control signal supplied via the control line 9 to the actuator 10 as illustrated in the embodiment of FIG. 4. Multiple different signal sources 5 can be used with the same activation unit 10. Some signal sources can be capable of generating their own energy and thereby do not need a separate power source. Other signal sources will require a local power source LPS as illustrated in the embodiment of FIG. 5. Dependent on the strength of the reflection caused by the actuator 10 signaling of the individual signal sources will differ in strength in order to be able to differentiate between the signal sources 5 within in the OTDR 2.

In a possible embodiment the signaling sources 5 are connected to the processor 8 via a wireless link. This wireless connection can build on WLAN, NFC, ZigBee and/or Bluetooth or similar technologies. The energy for the wireless connection can be harvested using an energy harvesting signal source which transforms for instance mechanical energy into electrical power. For such sensor connections an additional energy source to the splice box can be required for continuous sensing of RF signals. In this case sufficient measures against tampering with RF signaling have to be taken. Due to low cost of installation and low cost of the sensors themselves multiple signal sources can be used at the same observation target or object such as a manhole lid of a manhole.

In a possible embodiment signal sources 5 and/or actuators 10 can be powered electrically by local power source 11 as shown in the embodiment of FIG. 5. A local power source can comprise an energy storage unit to store electrical power such as a battery. In a possible implementation the energy storage unit can be placed for instance near a splice box. The battery can provide for example electrical energy with a minimum lifetime of e.g. 10 to 15 years under foreseeable environmental conditions. Potentially a solar cell can be added to extend the lifetime of the battery. Whenever an energy storage unit such as a battery is used in the system as a local power source 11 a detector can be provided to detect when the battery nears the end of its operation life. In this embodiment the electro-optical signaling unit 4 can be configured to signal to the OTDR 2 that its local power source 11, e.g. its battery needs to be replaced. In a possible implementation one can periodically change the reflection with a certain amount (for instance 3 dB) or one can potentially try to increase the reflection.

In a further possible embodiment an energy converter can be used as a local power source 11 configured to convert optical power into electrical power. The energy converter can be configured to convert optical power of an optical signal received from a light source via the optical fiber 3 at a wave pump wavelength. Further it is possible that the energy converter converts optical power of an optical signal received via separate optical fiber into electrical power. A separate light source can be applied e.g. by use of an additional wavelength in the customer optical fiber 3 or by use of an additional parallel optical fiber. At each location of an electro-optical signaling unit 4 a predefined portion of the transmitted light can be tapped and supplied to the local energy converter which converts the received optical power into electrical power used locally. In a possible embodiment the converted electrical energy can also be accumulated over a certain time using a suitable energy storage unit in the electro-optical signaling unit 4. The optical probe signal OPS does not carry sufficient energy to be converted by an energy converter into electrical power. However, an additional continuous wave pump wavelength can be added spectrally separated from the OTDR monitoring signal OPS to provide a remote feeding of the components within the electro-optical signaling unit 4.

Figure 21:
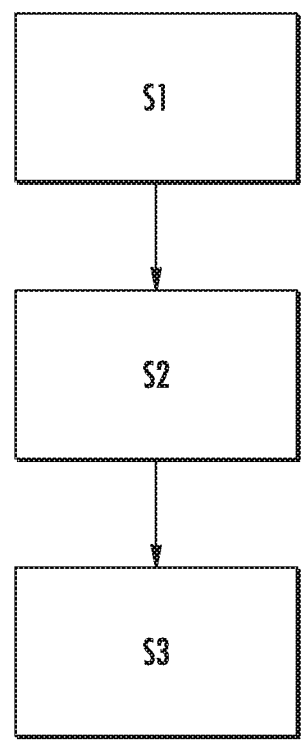
FIG. 21 illustrates a flowchart for a possible exemplary embodiment of the method for remote sensing of information according to the second aspect of the present invention.

FIG. 21 shows a flowchart of a possible exemplary embodiment of a method according to the second aspect of the present invention.

The method for remote sensing of information to be transmitted according to the second aspect of the present invention comprises several main steps as illustrated in the flowchart of FIG. 21.

In a first step S1 an optical probe signal OPS is transmitted by an optical time-domain reflectometer 2 via an optical fiber 3.

In a further step S2 an attenuation and/or reflection of the optical probe signal OPS transported through said optical fiber 3 is changed depending on information to be transmitted.

In a further step S3 the backscattered optical signal is measured by the optical time-domain reflectometer 2 connected to the optical fiber 3 to sense or detect the information or data to be transmitted.

In a possible embodiment the attenuation and/or reflection of the optical probe signal OPS transported to said optical fiber 3 can be changed in step S2 depending on at least one signal provided by one or more signal sources 5 in response to information or data to be transmitted, in particular in response to environmental changes sensed by infield passive sensors. The information to be transmitted can comprise environmental changes transformed by corresponding sensors as signal sources 5 into sensor signals. The attenuation and/or reflection of the optical probe signal OPS transported through the optical fiber 3 can then be changed depending on the sensor signals representing the environmental changes.

Further, the information to be transmitted can also comprise device 7 information of one or more devices connected to the optical fiber 3.

The system for remote sensing of information or data to be transmitted according to the present invention forms a hybrid of electrical and optical components to signal back an optical reflection signal to an optical time-domain reflectometer 2 and thereby transmit the respective information. The system 1 according to the present invention can be used for detecting an intrusion. The system does require actively no moving parts operates with high reliability.

The system 1 according to the present invention can comprise several in-line electro-optical signaling units 4 located at different positions along an optical fiber 3. This embodiment as illustrated in FIG. 2 can be realized without the need of use of separate optical power splitters or optical couplers or external optical reflectors.

Signaling to the OTDR 2 can be done by generating or attenuating an optical reflection peak triggered by an electric harvesting signal source. Different kinds of energy harvesting signal sources or passive sensors can be used to activate or trigger the actuator 10 of the electro-optical signaling unit 4. For detecting the intrusion of a manhole no fragile optical cables need to be routed to the manhole lid. Instead an electrical cable 6 can be used as illustrated in the embodiment of FIG. 6. Instead of electrical wired connections wireless or RF based connections can also be used. This leads to a further reduction of installation efforts. Further, multiple different signal sources 5 can be connected in parallel for the activation of a single actuator 10 of the electro-optical signaling unit 4. These different signaling sources can be connected to a microprocessor which controls the actuator. A hold-off timer can be used to ensure that the OTDR 2 can detect a change in reflection with electrical energy.

The actuator 10 of the electro-optical signaling unit 4 can be controlled by a control data which can be binary to switch between low reflection and a high reflection of the optical probe signal OPS. In a further embodiment the control data supplied to the actuator 10 of the electro-optical signaling unit 4 can be multivalued controlling different amounts of reflection. In a possible embodiment the electro-optical signaling unit 4 is adapted to provide a multilevel optical signal. The multivalued control signal applied to the actuator 10 of the electro-optical signaling unit 4 allows to control different amounts of reflection.

A reduction of the required amount of energy can be realized with latching actuators 10 which consume energy only in the moment of activation or deactivation.

The system 1 for remote sensing of information according to the present invention comprising an optical time-domain reflectometer 2 can be used for a wide variation of use cases and is not restricted to the embodiments illustrated in FIGS. 1 to 20. The different embodiments shown in FIGS. 1 to 20 can be combined with each other.

What is claimed is:

1. A system for remote sensing of information to be transmitted, said system comprising:

an optical time-domain reflectometer, OTDR, adapted to transmit an optical probe signal into an optical fiber and to measure a backscattered signal power; and at least one electro-optical signaling unit connected to said optical fiber, wherein the electro-optical signaling unit is configured to change an attenuation and/or a reflection of the optical probe signal depending on at least one signal provided by at least one signal source in response to the information to be transmitted, wherein the at least one signal source is connected via a wired or wireless connection to a processor of said electro-optical signaling unit adapted to process the wired or wireless signals received from the at least one signal source and adapted to control an actuator of said electro-optical signaling unit to change the attenuation and/or reflection of the optical probe signal depending on the processed signals, wherein the actuator of said electro-optical signaling unit is adapted to change an attenuation and/or a reflection of the optical probe signal transported in said optical fiber or branched off from said optical fiber by an optical coupler, and wherein the actuator of the electro-optical signaling unit is adapted to control a gap of said optical fiber depending on the signals received from the at least one signal source.

2. The system according to claim 1 wherein electro-optical signaling units form in-line electro-optical signaling units located at different positions along said optical fiber, wherein each electro-optical signaling unit comprises an actuator adapted to change directly an attenuation and/or a reflection of the optical probe signal transported through said optical fiber.

3. The system according to claim 2 wherein a spatial distribution of the in-line electro-optical signaling units along said optical fiber is transformed in a corresponding time-multiplexing of the optical signal received by said optical time-domain reflectometer, OTDR.

4. The system according to claim 1 wherein the electro-optical signaling unit is adapted to provide a multilevel optical signal and/or a time encoded optical signal depending on the signal received from the at least one signal source.

5. The system according to claim 1 wherein the at least one signal source comprises sensors adapted to provide signals in response to information to be transmitted.

6. The system according to claim 1 wherein the at least one signal source is adapted to provide signals in response to device-relevant information of associated devices.

7. The system according to claim 1 wherein the at least one signal source is connected to the electro-optical signaling unit via a wired or wireless connection.

8. The system according to claim 1 wherein the actuator is a piezo actuator adapted to adjust the gap along said optical fiber and/or to move a filter across the gap.

9. The system according to claim 1 wherein the actuator of said electro-optical signaling unit comprises
an LCD actuator,
an e-ink actuator,
a MEMS actuator, and/or
an electric-optic modulator.

10. The system according to claim 1 wherein the at least one signal source and/or the actuator is powered electrically by a local power source.

11. The system according to claim 10 wherein the local power source comprises
an energy storage unit configured to store electrical power,
an energy harvester configured to harvest electrical power from the environment and/or
an energy converter configured to convert optical power into electrical power.

12. The system according to claim 11 wherein the energy harvester is configured to harvest electrical power from environmental energy to detect an intrusion.

13. The system according to claim 11 wherein the energy converter is configured to convert optical power of an optical signal received from a light source via said optical fiber at a wave pump wavelength or received via a separate optical fiber into electrical power.

14. The system according to claim 11 wherein electrical power harvested by said energy harvester and/or provided by said energy converter is accumulated over time and stored in an energy storage unit to power the actuator and/or the at least one signal source.

15. The system according to claim 11 wherein the environmental energy harvested by the energy harvester comprises mechanical energy of a mechanical object.

16. The system according to claim 5 wherein the sensors are adapted to monitor
an intrusion,
a humidity within the environment,
a temperature of the environment,
a pressure in the environment,
a presence of a fluid or gas in the environment,
a mechanical tension or force,
a light or signal in the environment,
a tilt of an object,
a presence of smoke and/or fire in the environment and/or
a thermal expansion.

17. The system according to claim 1 wherein the actuator comprises a latching actuator which consumes electrical power only in the moment of activation and deactivation.

18. A method for remote sensing of information to be transmitted, the method comprising:
transmitting, by an optical time-domain reflectometer, OTDR, an optical probe signal via an optical fiber;
changing, by at least one electro-optical signaling unit connected to said optical fiber, an attenuation and/or a reflection of the optical probe signal transported through said optical fiber depending on at least one signal provided by at least one signal source in response to information to be transmitted, wherein the at least one signal source is connected via a wired or wireless connection to a processor of said electro-optical signaling unit and wherein the method further comprises:
processing, by said processor, the wired or wireless signals received from the at least one signal source and controlling, by said processor, an actuator of said electro-optical signaling unit to change the attenuation and/or reflection of said optical probe signal transported in said optical fiber or branched off from said optical fiber by an optical coupler depending on the processed signals;
controlling, by said actuator of said electro-optical signaling unit, a gap of said optical fiber depending on the signals received from said at least one signal source; and
measuring the backscattered optical signal by the optical time-domain reflectometer, OTDR, connected to said optical fiber to sense the information to be transmitted.

19. The method according to claim 18 wherein the information to be transmitted comprises environmental changes transformed by corresponding sensors as signal sources into sensor signals,
wherein the attenuation and/or reflection of the optical probe signal transported through said optical fiber is changed depending on the sensor signals representing the environmental changes.

20. The method according to claim 18 wherein the information to be transmitted comprises device information of one or more devices connected to said optical fiber.

* * * * *